Dec. 31, 1963     E. P. WARNKEN     3,115,988
LAMINATED WALL STRUCTURE FOR A NOSE CONE
AND METHOD OF MAKING SAME
Filed Jan. 21, 1960     2 Sheets-Sheet 1
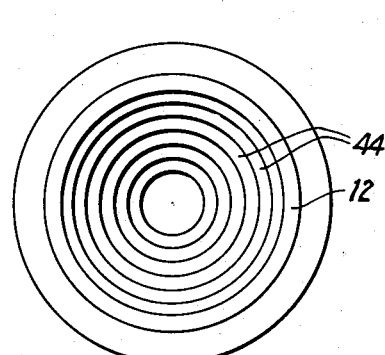
FIG. 2.
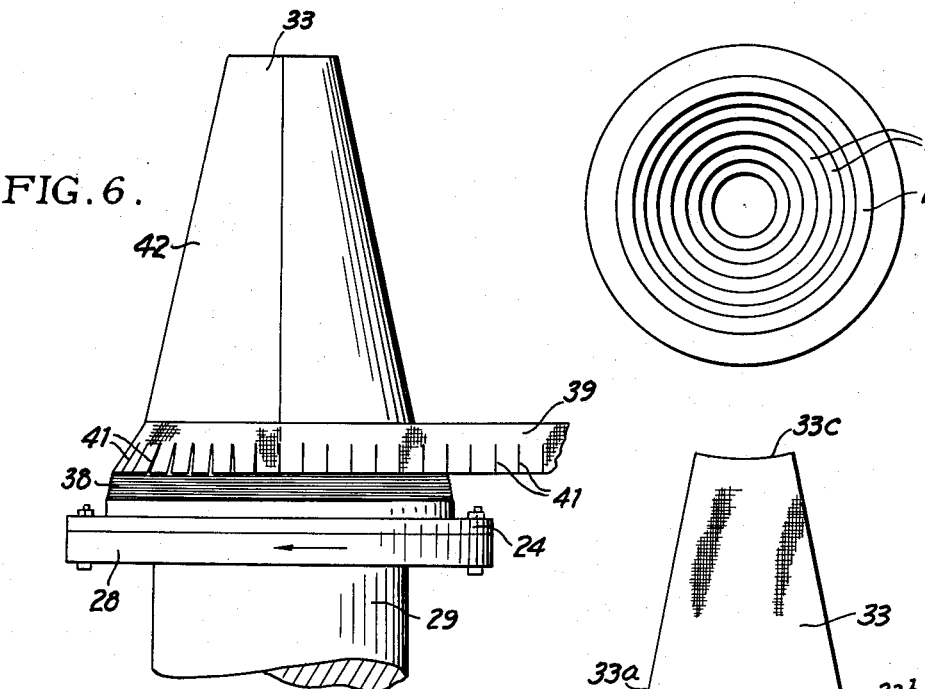
FIG. 6.
FIG. 5.
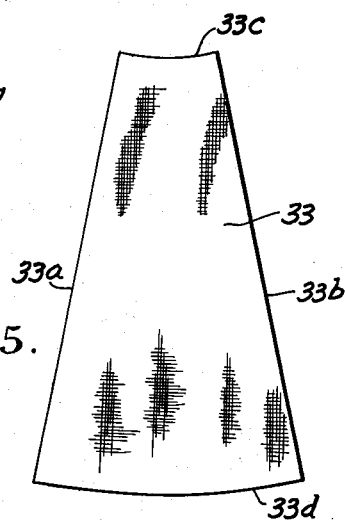
FIG. 1.
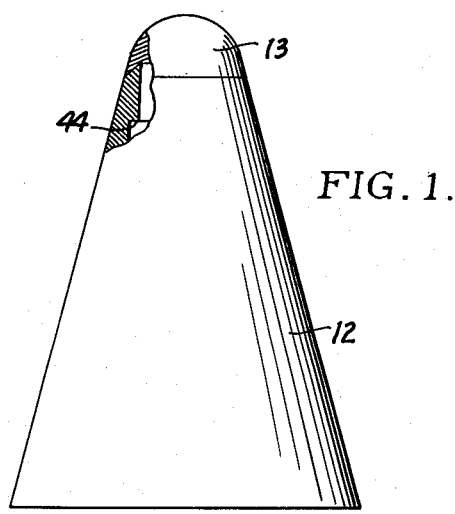
INVENTOR.
ELMER P. WARNKEN
BY
*Pearce and Schaeperklaus*
ATTORNEYS

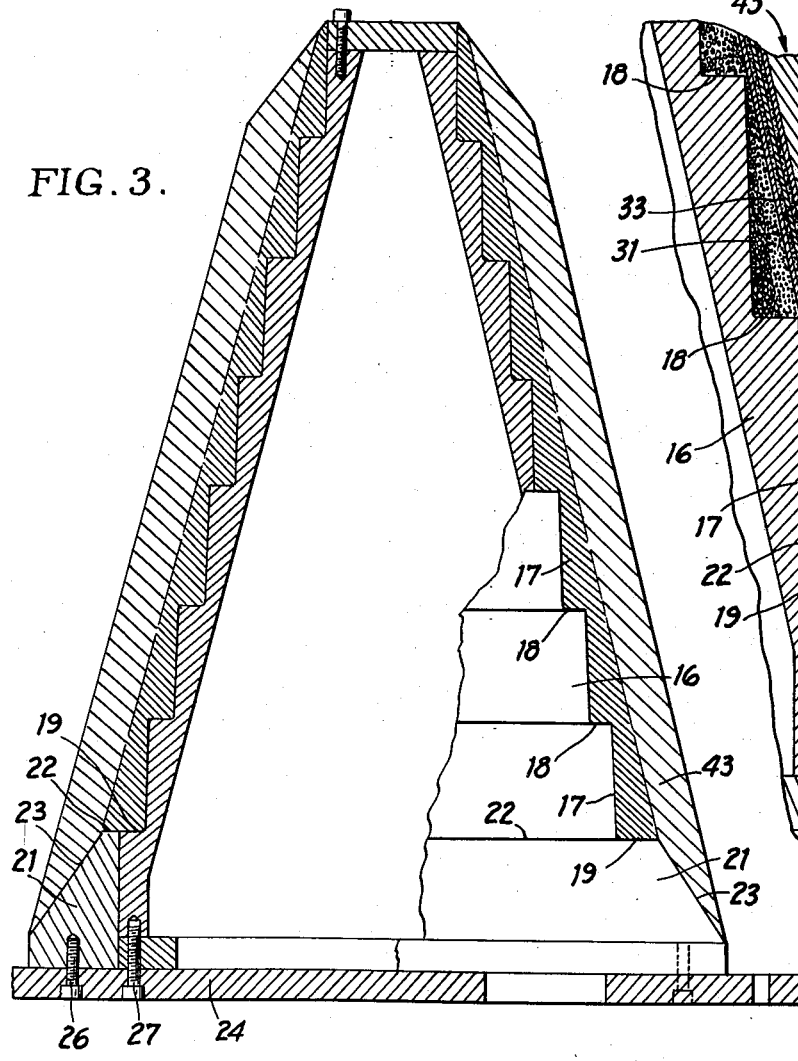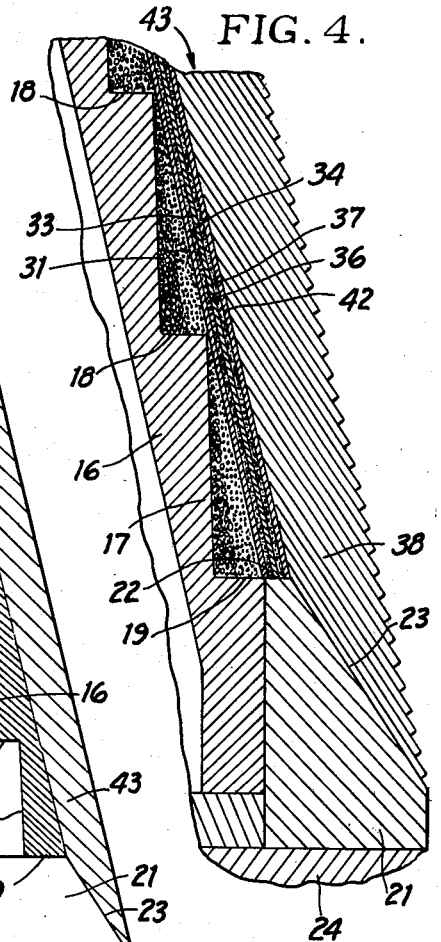

United States Patent Office 3,115,988
Patented Dec. 31, 1963

3,115,988
LAMINATED WALL STRUCTURE FOR A NOSE
CONE AND METHOD OF MAKING SAME
Elmer P. Warnken, Cincinnati, Ohio, assignor to
Studebaker Corporation, a corporation of Michigan
Filed Jan. 21, 1960, Ser. No. 3,977
8 Claims. (Cl. 220—83)

This invention relates to a laminated wall structure for articles used in locations in which high fluid velocities are encountered, such as in the construction of a nose cone for a ballistic missile or the like.

An object of this invention is to provide a reentry body or nose cone structure in which high strength is provided both lengthwise and radially thereof and in which an outer face thereof is constructed of overlapping laminations which resist stripping off or separation of laminations and crack formation between laminations.

This invention is an improvement over the devices shown and claimed in my copending application Serial No. 734,345, filed May 9, 1958, now Patent No. 3,081,205.

A further object of this invention is to provide a resin-impregnated laminated nose cone having strengthening laminations which extend lengthwise thereof, circumferential windings which provide strength in a circumferential direction and an outer protective layer of overlapping laminations for resisting ablation.

A further object of this invention is to provide a nose cone structure in which circumferential strength is provided by a continuous winding of resin-impregnated filamentary material which is bonded to other laminations during molding thereof.

A further object of this invention is to provide a nose cone structure of this type in which lengthwise laminations alternate between layers of continuous circumferential windings so that the lengthwise laminations and the circumferential windings can cooperate to form a strong, highly shock-resistant structure.

The above and other objects and features of the invention will be apparent to those skilled in the art to which this invention pertains, from the following detailed description, and the drawings, in which:

FIG. 1 is a view in side elevation showing a nose cone constructed in accordance with an embodiment of this invention, a nose cap covering the small end thereof, a part of the cap and a part of the nose cone being broken away to reveal interior construction;

FIG. 2 is a bottom plan view of the nose cone illustrated in FIG. 1;

FIG. 3 is an enlarged view partly in transverse section and partly in elevation showing a mandrel on which the nose cone is wrapped, the nose cone being shown wrapped thereon, the nose cone being shown in section;

FIG. 4 is an enlarged fragmentary view in transverse section showing the windings and laminations of the nose cone in position on a fragment of the mandrel;

FIG. 5 is a top plan view showing one of the lengthwise laminations of the nose cone;

FIG. 6 is a somewhat schematic view of a nose cone partly formed, the nose cone being shown mounted on the mandrel, the mandrel being shown mounted on the shaft of a winding machine, details of construction of the winding machine being omitted.

In the following detailed description and the drawing, like reference characters indicate like parts.

In FIGS. 1 and 2 is shown a nose assembly for a ballistic missile which includes a nose cone or body 12 constructed in accordance with an embodiment of this invention. The nose cone is used as a portion of a missile which is projected to high altitudes above the normal atmosphere, and the nose cone is adapted to reenter the atmosphere. A nose cap 13 covers the small end of the nose cone. The nose cone assembly can be attached to the body of a ballistic missile (not shown) in any appropriate manner.

Details of construction of the nose cone or body are shown in FIGS. 3 and 4. The body is formed on a mandrel 16 which is of generally frusto-conic shape. The outside face of the mandrel includes a plurality of cylindrical sections 17 and a plurality of annular sections 18 and 19. The annular and cylindrical sections of the face alternate along the length of the mandrel so that the surface of the mandrel is of irregular configuration being provided with a plurality of steps or shoulders. Below the lowermost annular face 19 is located a positioning ring 21 having an upper annular face 22 and an outer frusto-conic face 23. The ring 21 and the mandrel 16 can be mounted on a face plate 24 with the annular face 22 of the ring 21 aligned with the lowermost annular face 19 of the mandrel.

The ring 21 and the mandrel 16 are attached to the face plate 24 by bolts 26 and 27, respectively. The face plate 24, in turn, can be attached to a flange 28 (FIG. 6) mounted on a shaft 29. The shaft 29 can be turned by appropriate apparatus (not shown) so that resin-impregnated laminations can be wound on the mandrel to build up the nose cone. As shown most clearly in FIG. 4, the first winding is formed of substantially continuous resin-impregnated circumferential rovings 31 of glass fibers or other filamentary material or the like, which are wound on the mandrel in the spaces between outer edges of annular sections 18 and 19 of the outer face of the mandrel to form a substantially smooth frusto-conic face on the mandrel. Over the rovings 31 are placed lengthwise resin-impregnated fabric laminations 33 of the shape shown in FIG. 5. The laminations 33 can be formed of resin-impregnated glass fiber cloth sheets or the like. Each lamination 33 has radially extending sides 33a and 33b and arcuate ends 33c and 33d. A layer of laminations 33 can consist of four laminations arranged around the circumference. The laminations 33 cover and overlie the rovings 31 to form a resin-impregnated cloth layer extending substantially the length of the mandrel. Then a layer of circumferential rovings 34 is wound on top of the cloth laminations 33. Thereafter, alternate lengthwise laminations of resin-impregnated glass fiber cloth 36 and roving windings 37 are disposed over the laminations already wound on the mandrel. Finally, an outer, ablation-resistant layer of overlapping tape laminations 38 is wrapped as an outer layer. The laminations 38 are formed by a tape or strip 39 (FIG. 6) of resin-impregnated glass fiber cloth or the like. The first layer of the tape is wrapped on the frusto-conic face 23 of the ring 21 (FIG. 3) and thereafter layers of tape are wrapped one on top of the other in face-to-face overlapping relation. The tape is provided with spaced slits 41 (FIG. 6) along one edge so that, as the tape is wound on the mandrel surrounding the outermost lengthwise glass fiber cloth lamination 42, the slit edges can open at the slits as shown in FIG. 6, to permit winding of the tape laminations upon the laminations already built up. The tape laminations are wound for the length of the mandrel to form an outer layer 43 (FIG. 3). As shown in FIG. 4 the tape laminations intersect the outer surface at an angle of approximately 20 to 21 degrees therewith. A minor portion of one face of each tape or convolute lamination along an edge thereof is exposed at the outer surface with a major portion of each tape of convolute lamination being overlapped by an adjacent tape or convolute lamination. Then the laminations on the mandrel are heated and molded in appropriate molding equipment not shown, to cure the resin of the laminations to form a unitary mass. The resin may be an appropriate phenol-formaldehyde resin or the like or other suitable thermosetting resin of the type used in molding glass fiber laminations. Thereafter, the molded nose cone body can be removed from the mandrel, and the outer face thereof can be machined, as desired. The plurality of steps or shoulders 44 (FIGS. 1 and 2) formed on the interior of the nose cone body or wall can be employed for fastening appropriate internal structures (not shown).

The nose cone body illustrated in the drawings and described above is subject to structural modification without departing from the scope of the appended claims.

Having described my invention, what I claim as new and desire to secure by Letters Patent is:

1. A laminated wall for a nose cone which comprises alternate continuous resin-impregnated circumferential filamentary winding laminations and lengthwise thermosetting resin-impregnated fabric laminations overlying the filamentary windings, and a thermosetting resin-impregnated fabric strip forming a plurality of convolute laminations arranged in face-to-face aligned parallel overlapping relation overlying the other laminations, the convolute laminations forming an ablation-resisting outer surface, a minor portion of one face of each convolute lamination along an edge thereof being exposed at said surface with a major portion of each convolute lamination face being overlapped by an adjacent convolute lamination.

2. A laminated wall for a nose cone which comprises a continuous resin-impregnated circumferential filamentary winding lamination, a lengthwise thermosetting resin-impregnated fabric lamination overlying the filamentary windings, and a thermosetting resin-impregnated fabric strip forming a plurality of convolute laminations arranged in face-to-face aligned parallel overlapping relation overlying the other laminations, the convolute laminations forming an ablation-resisting outer surface, a minor portion of one face of each convolute lamination along an edge thereof being exposed at said surface with a major portion of each convolute lamination face being overlapped by an adjacent convolute lamination.

3. A method of forming a laminated annular wall for a nose cone which comprises wrapping on a mandrel alternate layers of continuous, circumferential resin-impregnated filamentary winding laminations and lengthwise thermosetting resin-impregnated fabric laminations overlying the filamentary winding, wrapping thereon a thermosetting resin-impregnated fabric strip forming a plurality of convolute laminations arranged in face-to-face aligned parallel overlapping relation overlying the other laminations, molding the laminations and curing resin of the laminations, the convolute laminations forming an ablation resisting outer surface, a minor portion of one face each convolute lamination along an edge thereof being exposed at said surface with a major portion of each convolute lamination face being overlapped by an adjacent convolute lamination.

4. A method of forming a laminated annular wall for a nose cone which comprises wrapping on a mandrel having a plurality of steps thereon, a continuous circumferential thermosetting resin-impregnated filamentary winding-lamination to fill the steps, wrapping on the mandrel alternate layers of continuous, circumferential thermosetting resin-impregnated filamentary winding laminations and lengthwise resin-impregnated fabric laminations overlying the filamentary winding, wrapping thereon a resin-impregnated fabric strip forming a plurality of convolute laminations arranged in face-to-face aligned parallel overlapping relation overlying the other laminations, molding the laminations and curing resin of the laminations, the convolute laminations forming an ablation-resisting outer surface, a minor portion of one face of each convolute lamination along an edge thereof being exposed at said surface with a major portion of each convolute lamination face being overlapped by an adjacent convolute lamination.

5. A method of forming a laminated annular wall for a nose cone which comprises wrapping on a mandrel of irregular outer configuration a continuous circumferential thermosetting resin-impregnated filamentary winding lamination to provide a substantially smooth face, overlaying the filamentary winding with a lengthwise thermosetting resin-impregnated fabric lamination overlying the filamentary winding, wrapping thereon a resin-impregnated fabric strip forming a plurality of convolute laminations arranged in face-to-face aligned parallel overlapping relation overlying the other laminations, molding the laminations and curing resin of the laminations, the convolute laminations forming an ablation-resisting outer surface, a minor portion of one face of each convolute lamination along an edge thereof being exposed at said surface with a major portion of each convolute lamination face being overlapped by an adjacent convolute lamination.

6. A method of forming a laminated annular wall for a nose cone which comprises wrapping on a mandrel a layer of continuous, circumferential thermosetting resin-impregnated filamentary winding laminations, overlaying the filamentary winding with a lengthwise thermosetting resin-impregnated fabric lamination overlying the filamentary winding, wrapping thereon a thermosetting resin-impregnated fabric strip forming a plurality of convolute laminations arranged in face-to-face aligned parallel overlapping relation overlying the other laminations, molding the laminations and curing resin of the laminations, the convolute laminations forming an ablation-resisting outer surface, a minor portion of one face of each convolute lamination along an edge thereof being exposed at said surface with a major portion of each convolute lamination face being overlapped by an adjacent convolute lamination.

7. A laminated wall for a nose cone which comprises alternate continuous resin-impregnated circumferential filamentary winding laminations and lengthwise thermosetting resin-impregnated fabric laminations overlying the filamentary windings, and a thermosetting resin-impregnated fabric strip forming a plurality of convolute laminations arranged in face-to-face aligned parallel overlapping relation overlying the other laminations, the convolute laminations forming an ablation-resisting outer surface, the convolute laminations intersecting said surface at an angle of approximately 20 to 21 degrees therewith, a minor portion of one face of each convolute lamination along an edge thereof being exposed at said surface with a major portion of each convolute lamination face being overlapped by an adjacent convolute lamination.

8. A laminated wall for a nose cone in accordance with claim 7 characterized by the fact that the innermost laminations are filamentary windings and that innermost laminations form a plurality of shoulders on the interior of the wall.

References Cited in the file of this patent

UNITED STATES PATENTS

| | | |
|---|---|---|
| 2,279,630 | McMahon | Apr. 14, 1942 |
| 2,539,404 | Crutchfield et al. | Jan. 30, 1951 |
| 2,594,693 | Smith | Apr. 29, 1952 |
| 2,614,058 | Francis | Oct. 14, 1952 |
| 2,744,043 | Ramberg | May 1, 1956 |
| 2,791,241 | Reed | May 7, 1957 |
| 2,792,324 | Daley | May 14, 1957 |
| 2,838,435 | Hewett | June 10, 1958 |
| 2,877,150 | Wilson | Mar. 10, 1959 |
| 2,905,578 | Rees et al. | Sept. 22, 1959 |
| 2,960,753 | Robertson | Nov. 22, 1960 |
| 2,969,812 | De Ganahl | Jan. 31, 1961 |